US011000996B2

(12) United States Patent
Chen et al.

(10) Patent No.: US 11,000,996 B2
(45) Date of Patent: May 11, 2021

(54) EXTRUDER DEVICE

(71) Applicant: Advanced Biomedical Technology Inc., Hsinchu (TW)

(72) Inventors: Ding-Yuan Chen, Hsinchu (TW); Chun-Hung Chen, Hsinchu (TW); Chia-Chi Ho, Hsinchu (TW); Sheng-Nan Kuo, Hsinchu (TW)

(73) Assignee: ADVANCED BIOMEDICAL TECHNOLOGY INC., Hsinchu (TW)

( * ) Notice: Subject to any disclaimer, the term of this patent is extended or adjusted under 35 U.S.C. 154(b) by 384 days.

(21) Appl. No.: 16/014,001

(22) Filed: Jun. 21, 2018

(65) Prior Publication Data

US 2018/0370132 A1  Dec. 27, 2018

Related U.S. Application Data

(60) Provisional application No. 62/523,224, filed on Jun. 21, 2017.

(30) Foreign Application Priority Data

Sep. 21, 2017 (TW) ................................. 106132457

(51) Int. Cl.
*B29C 64/209* (2017.01)
*B29C 64/393* (2017.01)
(Continued)

(52) U.S. Cl.
CPC ............ *B29C 64/209* (2017.08); *B29C 48/05* (2019.02); *B29C 48/266* (2019.02);
(Continued)

(58) Field of Classification Search
CPC ... B29C 64/118; B29C 64/209; B29C 64/295; B29C 64/307; B29C 64/321;
(Continued)

(56) References Cited

U.S. PATENT DOCUMENTS

| 2016/0031159 | A1* | 2/2016 | Church | B29C 64/106 264/308 |
| 2017/0368755 | A1* | 12/2017 | Bader | G05B 19/4099 |
| 2018/0281280 | A1* | 10/2018 | Solorzano | B33Y 30/00 |

\* cited by examiner

*Primary Examiner* — Xiao S Zhao
*Assistant Examiner* — Joseph S Leyson
(74) *Attorney, Agent, or Firm* — Bacon & Thomas, PLLC

(57) ABSTRACT

A secure extruder device includes a material delivery channel, a nozzle part, a parameter part, a thermal-control part, a material auto-destruction module and/or a parameter auto-destruction module. The material delivery channel is assembled with an extrusion part. The nozzle part is connected to the material delivery channel for ejecting material in the material delivery channel out. The parameter part provides parameters for a printing task to a microcontroller. The thermal-control part heats the nozzle part according to the parameters for the printing task. The material auto-destruction module destroys the material delivery channel after the printing task is completed. The parameter auto-destruction module destroys the parameters for the printing task after the printing task is completed. The microcontroller controls the extrusion part based on the parameters for the printing task so that the extrusion part delivers the material disposed inside the material delivery channel to the nozzle part.

18 Claims, 7 Drawing Sheets

(51) Int. Cl.
*B33Y 30/00* (2015.01)
*B29C 64/295* (2017.01)
*B29C 48/86* (2019.01)
*B29C 64/118* (2017.01)
*B29C 64/386* (2017.01)
*B29C 48/92* (2019.01)
*B33Y 70/00* (2020.01)
*B33Y 10/00* (2015.01)
*B29C 48/05* (2019.01)
*B29C 48/25* (2019.01)
*B33Y 80/00* (2015.01)
*B33Y 50/02* (2015.01)

(52) U.S. Cl.
CPC .......... *B29C 48/865* (2019.02); *B29C 48/872* (2019.02); *B29C 48/92* (2019.02); *B29C 64/118* (2017.08); *B29C 64/295* (2017.08); *B29C 64/386* (2017.08); *B29C 64/393* (2017.08); *B33Y 10/00* (2014.12); *B33Y 30/00* (2014.12); *B33Y 70/00* (2014.12); *B29C 2948/926* (2019.02); *B29C 2948/92876* (2019.02); *B29K 2995/0056* (2013.01); *B33Y 50/02* (2014.12); *B33Y 80/00* (2014.12)

(58) Field of Classification Search
CPC ..... B29C 64/386; B29C 64/393; B29C 48/05; B29C 48/266; B29C 48/865; B29C 48/872; B29C 48/92; B29C 2948/926; B29C 2948/92876; B33Y 10/00; B33Y 30/00; B33Y 50/02; B33Y 70/00; B33Y 80/00

See application file for complete search history.

EXTRUDER DEVICE

BACKGROUND OF THE INVENTION

1. Field of the Invention

The present invention relates to an extruder device and, more particularly, to an extruder device suitable for multi-dimensional additive manufacturing.

2. Description of Related Art

The existing technology of additive manufacturing, including three-dimensional (3D) or 4D-nD spatial printing, etc., becomes increasingly popular, but has less application in the medical field. In addition, users have to input the specific printing parameter for selected materials and 3D image into the additive manufacturing machine for printing task. However, data storing in the machine, such as patient's 3D defect image or printing parameters, etc., is confidential data, such as private medical related information and technical know-how data, that should not be exposed. If users forget to delete confidential data above, risk of data exposure will be existed. And that's the major problem, about the data security, the existing technology encounters now.

Therefore, it is desirable to provide an improved novel extruder device to solve the aforementioned problem.

SUMMARY OF THE INVENTION

The present invention provides an extruder device which includes a material delivery channel, a nozzle part, a parameter part, a thermal-control part, and a material auto-destruction module. The material delivery channel assembles with an extrusion part and connects to the nozzle part. The nozzle part ejects the material in the material delivery channel to outside. The parameter part provides printing parameters for a printing task to a microcontroller. The thermal-control part heats the nozzle part according to the printing parameters. The material auto-destruction module destroys the material delivery channel after the printing task completing. The microcontroller controls the extrusion part based on the printing parameters to deliver the material disposing inside the material delivery channel to the nozzle part for performing the printing task.

In one embodiment, after the printing task completing, the material auto-destruction module drives the thermal-control part to melt the material delivery channel. In one embodiment, the extruder device further includes a parameter auto-destruction module for printing parameters automatic deletion after the printing task completing. In one embodiment, the thermal-control part further includes a cooling part to maintain the material delivery channel at low temperature status. In one embodiment, the extruder device includes an image-conversion part to process the image data to obtain a digital printing roadmap recognizable for the microcontroller. In one embodiment, the extruder device includes an image-input part for receiving image data from outside. In one embodiment, the extruder device includes an scanner part to scan a target-site to obtain a 3D image. In one embodiment, the material delivery channel is made of biocompatible materials. In one embodiment, the nozzle part is made of biocompatible materials. In one embodiment, the material for printing is biodegradable.

The present invention further provides an extruder device which includes a material delivery channel, a nozzle part, a parameter part, a thermal-control part, and a parameter auto-destruction module. The material delivery channel assembles with an extrusion part and connects to the nozzle part. The nozzle part ejects material in the material delivery channel to outside. The parameter part provides printing parameters of a printing task to a microcontroller. The thermal-control part heats the nozzle part according to the printing parameters. The parameter auto-destruction module destroys the printing materials after the printing task completing. The microcontroller drives the extrusion part based on the printing parameters to deliver the material disposing inside the material delivery channel to the nozzle part for performing the printing task.

Other objects, advantages, and novel features of the invention will become more apparent from the following detailed description when taken in conjunction with the accompanying drawings.

DETAILED DESCRIPTION OF THE PREFERRED EMBODIMENT

In the following description, various embodiments will be provided to explain the implementation and operation of the extruder device of the present invention. The person skilled in the art of the present disclosure will understand the features and advantages of the present invention through these embodiments. Various combinations, modifications, substitutions or adaptations may be realized based on the present invention.

In addition, the term "connected" as used herein may refer to direct connection or indirect connection, and is not limited thereto. The term "when . . . " or " . . . when" is used herein to mean "present, before, or after" and is not limited thereto.

Figure 1:
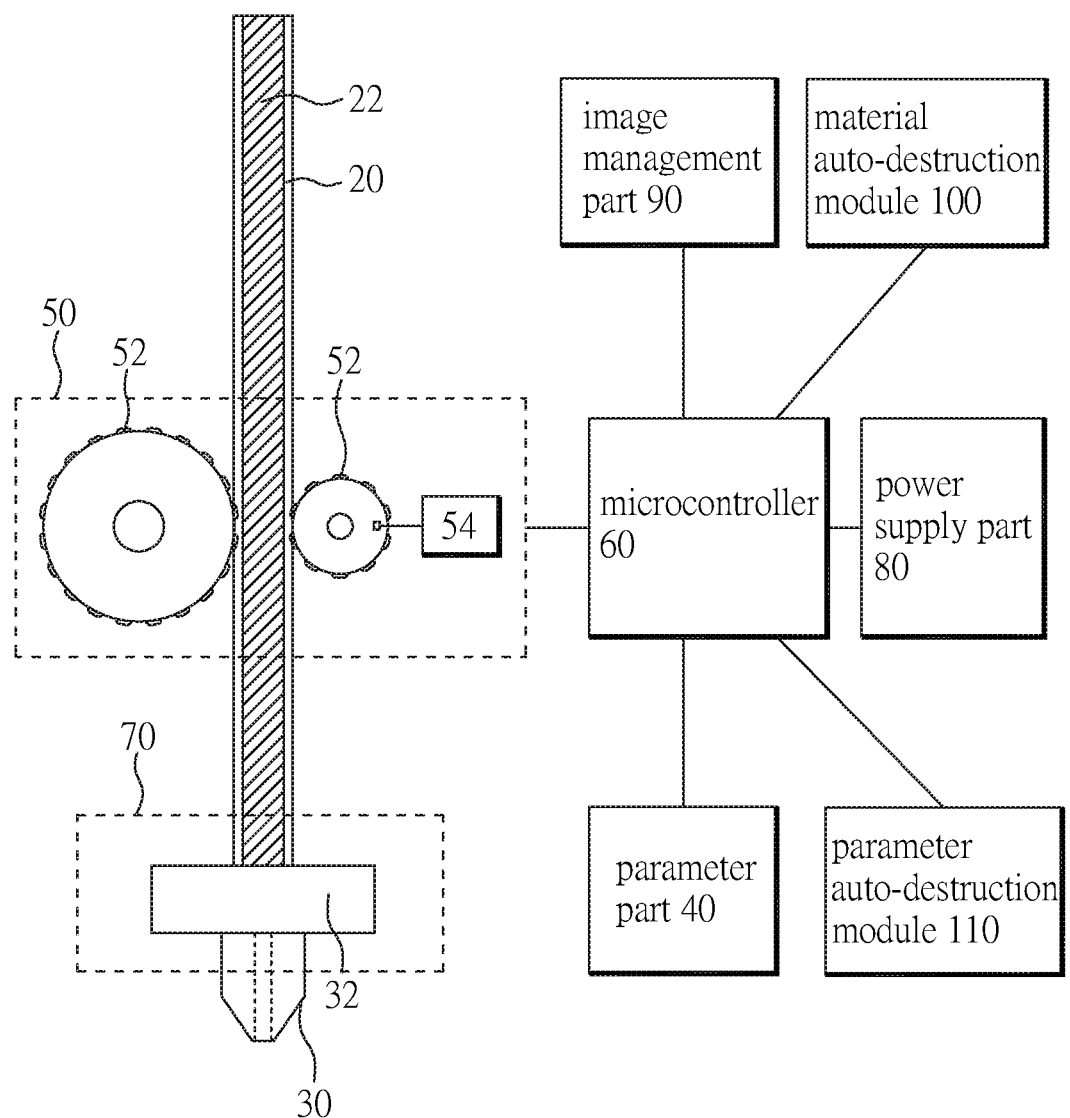
FIG. 1 is a schematic diagram illustrating the main structure of the extruder device according to an embodiment of the present invention.

FIG. 1 is a schematic diagram illustrating the main structure of the extruder device 10 according to an embodiment of the present invention. As shown in FIG. 1, the extruder device 10 includes a material delivery channel 20, a nozzle part 30, and a parameter part 40, wherein material 22 may be filled in the material delivery channel 20. The material delivery channel 20 may be assembled with an extrusion part 50. The extrusion part 50 receives instructions from a microcontroller 60. For example, the microcontroller 60 may transmit instructions to drive the extrusion part 50 to extrude the material delivery channel 20 to move the material 22 forward to nozzle part 30. The nozzle part 30 ejects the material 22 out for printing. The parameter part 40 provides printing parameters for a printing task (for example, printout of a product according to the 3D image data, etc.), so that the microcontroller 60 controls the extrusion part 50 to perform a printing task according to the printing parameters.

The extruder device 10 is suitable for multi-dimensional space additive manufacturing (eg, 2D plane, 3D space, 4D to nD space (three-dimensional space+multi-axial rotation+time+material properties+ . . . ), wherein D may represent dimension (printing space) and dynamic (axial rotation+time parameters+material parameters+ . . . ). The extruder device 10 has a connecting device (not shown) for assembly with an external machine. The external machine may be suitable for multi-dimensional space additive manufacturing, such as a 3D printer, an nD printer (where n is more than 4), a robot arm, etc., but it is not limited thereto. For the sake of clarity, the following paragraphs will be given by taking the 3D printer as an example.

In one embodiment, the extruder device 10 further includes a thermal-control part 70 for controlling the temperature of the material delivery channel 20 and/or the nozzle part 30. In one embodiment, the extruder device 10 further includes a power supply part 80 for providing electricity to operate the extruder device 10. In one embodiment, the extruder device 10 further includes an image management part 90 for managing the image using for the printing task. In one embodiment, the extruder device 10 further includes a material auto-destruction module 100 and a parameter auto-destruction module 110 for automatically destroying at least a portion of components of the extruder device and/or data storing in the extruder device when the printing task is completed. In other embodiments, the extruder device 10 may include only the material auto-destruction module 100 or only the parameter auto-destruction module 110.

In the following, a detailed description is given for the material delivery channel 20, the material 22, the nozzle part 30, the parameter part 40, the extrusion part 50, the microcontroller 60, the thermal-control part 70, the power supply part 80, the image management part 90, the material auto-destruction module 100 and the parameter auto-destruction module 110, respectively.

In one embodiment, the material delivery channel 20 is composed of biocompatible material, such as material conforming to the bio-compatibility specification ISO 10993 of the medical device regulations, and it is not limited thereto. The material delivery channel 20 may be entirely composed of the biocompatible material or partially composed of the biocompatible material, and the present invention is not limited thereto. In one embodiment, the extruder device 10 includes multiple material delivery channels 20 to eject different materials 22.

In one embodiment, the material 22 is medical-grade material that, for example, maintains sterile, can be used for medical application, and can be implanted in the human body. In one embodiment, the material 22 is biocompatible and, for example, conforms to the bio-compatibility specification ISO 10993 of the medical device regulations. In addition, the material 22 may be biodegradable or non-biodegradable. In the case where the material 22 is biodegradable, in one embodiment, the material 22 includes polyesters, polylactic acids, polylactic acid-glycolic acids, calcium carbonates, calcium phosphates, calcium sulfates, starches, celluloses, chitins, collagens, gelatins, hyaluronic acids, polyglycolic acids, polyethylene glycols, polyethylene terephthalate, polyurethanes, alginates, or an arbitrary combination thereof, while in another embodiment, the material 22 is composed of an arbitrary combination of the above. In the case where the material 22 is non-biodegradable, in one embodiment, the material 22 includes polymethyl methacrylates, polyethylenes, tannins, polyesters, cobalt alloys, titanium alloys, nylons, polystyrenes, polypropylenes, vinyl resins, acrylonitrile-butadiene-styrene copolymers, carbons, or an arbitrary combination thereof, while in another embodiment, the material 22 is composed of an arbitrary combination of the above. In one embodiment, the material 22 is filled into the material delivery channel 20 prior to the extruder device 10 assembles with a 3D printer. For example, the material 22 is placed in the material delivery channel 20, and then the extruder device 10 directly assembles with the 3D printer. In another embodiment, the material 22 is disposed in the 3D printer before the extruder device 10 assembles with the 3D printer, and after the assembly of the extruder device 10 and the 3D printer, the material 22 is filled into the material delivery channel 20. In addition, the user himself/herself can fill different material 22 into the material delivery channel 20. The above description is only an example but not a limitation.

The nozzle part 30 is provided with a hole for material 22 ejection and, when the material delivery channel 20 is extruded by the extrusion part 50, the material 22 is ejected out through the ejection hole. In one embodiment, the nozzle part 30 is made of metal. Moreover, in another embodiment, the nozzle part 30 may be made of polymer or a mixture of metal and polymer, while the present invention is not limited thereto. In addition, the nozzle part 30 may be biocompatible and, when the nozzle part 30 is biocompatible, it can be applied to perform a printing task for clinical therapy, such as repairing human organs, and it is not limited thereto. As a result, the present invention can be applied to medical fields such as orthopedics, medical cosmetology, otolaryngology and neurosurgery. In one embodiment, a heat insulation medium 32 is provided above the nozzle part 30 for thermal insulation.

In one embodiment, the parameter part 40 stores printing parameters, such as temperature and materials ejecting amount etc., for the printing task, while the present invention is not limited thereto. In fact, the printing parameters may have more or fewer types. In one embodiment, the parameter part 40 connects to the microcontroller 60 and provides the printing parameters to the microcontroller 60. Moreover, in another embodiment, the parameter part 40 may transmit the printing parameters by using wireless transmission (for example, there is a chip in the parameter part 40 for wireless transmission). In addition, the parameter part 40 can be at least implemented by a circuit, for example, a circuit including a memory and other storage devices, or the parameter part 40 itself is a storage device. The details about the parameter part 40 will be further described in the following paragraphs.

In one embodiment, the extrusion part 50 includes a roller set 52 and a rotation motor 54. In one embodiment, the roller set 52 includes at least two rollers for sandwiching the material delivery channel 20. The rotation motor 54 is activated according to the instruction from the microcontroller 60 to drive the roller set 52 to rotate, thereby to extrude the material delivery channel 20. The extrusion part 50 may be disposed within the extruder device 10 or within the 3D printer (i.e., after the extruder device 10 assembling with the 3D printer, the roller set 52 is then employed to sandwich the material delivery channel 20). In one embodiment, the rotation motor 54 is connected to the microcontroller 60. Moreover, in another embodiment, the extrusion part 50 receives the instruction from the microcontroller 60 by a wireless transmission manner (for example, the extrusion part 50 is provided with a chip for wireless transmission). The above description is only an example but not a limitation.

The microcontroller 60 may be disposed in the extruder device 10 (i.e., the extruder device 10 itself is provided with the microcontroller 60), and the microcontroller 60 may also be disposed in the 3D printer so that the extruder device 10 is controlled by the commands issued from the 3D printer. In one embodiment, the microcontroller 60 can be removed manually. In addition, the microcontroller 60 is equipped with a chip for wireless transmission, and is capable of wirelessly controlling the operation of internal components of the extruder device 10. In one embodiment, the microcontroller 60 is provided with the functions of central processing unit (CPU) and a memory. The central processing unit is provided with the functions of program counter, memory address register (MAR), memory buffer register (MBR), instruction register (IR), instruction decoder (ID), arithmetic logic unit (ALU) and so on, and is not limited thereto. The memory can be a volatile memory, such as a dynamic random access memory (DRAM) or a static random access memory (SRAM), or a nonvolatile memory, such as a read only memory (ROM) or flash memory (FLASH), and is not limited thereto. The above description is only an example and, in actual application, the microcontroller 60 of the present invention may be implemented by any type of central processing unit and/or memory. In addition, in one embodiment, the extruder device 10 may be further provided with a wired or wireless module (not shown) for communication between the extruder device 10 and other information center.

The thermal-control part 70 is activated by the instruction from the microcontroller 60. In one embodiment, the thermal-control part 70 is disposed adjacent to the material delivery channel 20 and the nozzle part 30 to maintain the temperature of the material 22 in the material delivery channel 20 and the temperature of the nozzle part 30 for the printing task. In one embodiment, the thermal-control part 70 can be manually removed. More details about the thermal-control part 70 will be further described in the following paragraphs.

In one embodiment, the power supply part 80 is a charging interface or a charging plug that can connect to an external power supply to obtain the power necessary for the printing task. Moreover, in another embodiment, the power supply part 80 is a rechargeable battery or a replaceable battery. The power supply part 80 may be disposed in the extruder device 10, or in the 3D printer, while the present invention is not limited thereto. In addition, all the internal components of the extruder device 10 may be powered by a single power supply part 80, or powered by different power supply parts 80, for example, each internal component of the extruder device 10 has its own power supply part 80, while the present invention is not limited thereto.

The image management part 90 may be disposed in the extruder device 10 or in a 3D printer. In one embodiment, the image management part 90 connects to the microcontroller 60 for data transmission. Moreover, in other embodiments, the image management part 90 may also transmit data by a wireless transmission manner. More details about the image management part 90 will be further described in the following paragraphs.

The material auto-destruction module 100 or the parameter auto-destruction module 110 is disposed in the extruder device 10. In one embodiment, the material auto-destruction module 100 or the parameter auto-destruction module 110 is implemented by a chip, which itself has a microprocessor for executing a material auto-destruction program or a parameter auto-destruction program. In another embodiment, the material auto-destruction module 100 or the parameter auto-destruction module 110 can be implemented by a computer program product. When the microcontroller 60 incorporates into the computer program product, the auto-destruction programs can be executed by the microcontroller 60. More details about the material auto-destruction module 100 or the parameter auto-destruction module 110 will be further described in the following paragraphs.

The aforementioned description about the extruder device 10 and related components is only an example. In actual application, as long as the components can be reasonably implemented, they can be replaced or assembled arbitrarily. In other words, various changes or combinations created by people skilled in this art are belong to the scope of the present invention.

Figure 2A:
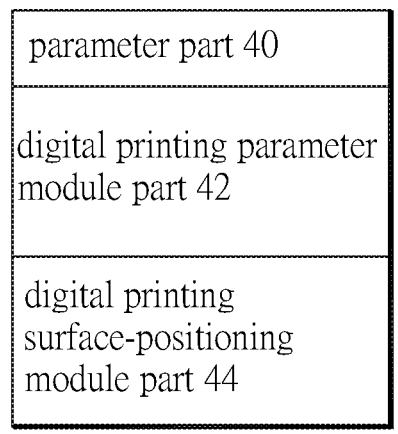
FIG. 2(A) is a schematic diagram illustrating the detailed structure of the parameter part according to an embodiment of the present invention.

Next, the details of the parameter part 40 will be described. FIG. 2(A) is a schematic diagram illustrating the detailed structure of the parameter part 40 according to an embodiment of the present invention. Please refer to FIG. 1 and FIG. 2(A) at the same time. In this embodiment, the parameter part 40 includes a digital printing parameter module part 42 and a digital printing surface-positioning module part 44.

The digital printing parameter module part 42 stores the parameters for the printing task, such as the temperature of the material delivery channel 20 or the nozzle part 30 for the printing task, while the present invention is not limited thereto. In one embodiment, the digital printing parameter module part 42 stores different parameters corresponding to different materials 22. In one embodiment, the digital printing parameter module part 42 may be controlled by a chip, to receive parameters provided by a user, to transmit parameters to the microcontroller 60, to store parameters, etc., while the present invention is not limited thereto. In one embodiment, the digital printing parameter module part 42 is reusable; that is, the user can modify the parameters, and it is not limited thereto. In addition, the digital printing parameter module part 42 is implemented by a circuit, or by a computer program product, when the microcontroller 60 incorporates into the computer program product, the digital printing parameter module part 42 is controlled by microcontroller 60. The aforementioned description is only an example and not a limitation of the present invention.

The digital printing surface-positioning module part 44 stores the parameters for the printing task, such as the actual position of the printing surface, the scope of the printing area, and the like, and it is not limited thereto. In one embodiment, the digital printing surface-positioning module part 44 is controlled by a chip to receive positioning parameter provided by a user, to transmit positioning parameters to the microcontroller 60, to store positioning parameters, and to analyze the positioning parameters corresponding to the printing task, and it is not limited thereto. In one embodiment, the digital printing surface-positioning module part 44 is reusable; that is, the user can input different positioning parameter, and it is not limited thereto. In one embodiment, the digital printing surface-positioning module part 44 is implemented by a circuit. Moreover, in another embodiment, the digital printing surface-positioning module part 44 is implemented by a computer program product, and as the microcontroller 60 incorporates into the computer program product, the digital printing surface-positioning module part 44 is controlled by the microcontroller 60. The aforementioned description is only an example and not a limitation of the present invention.

It is notable that both the digital printing parameter module part 42 and the digital printing surface-positioning module part 44 can work independently or together, while the present invention is not limited thereto.

Figure 2B:
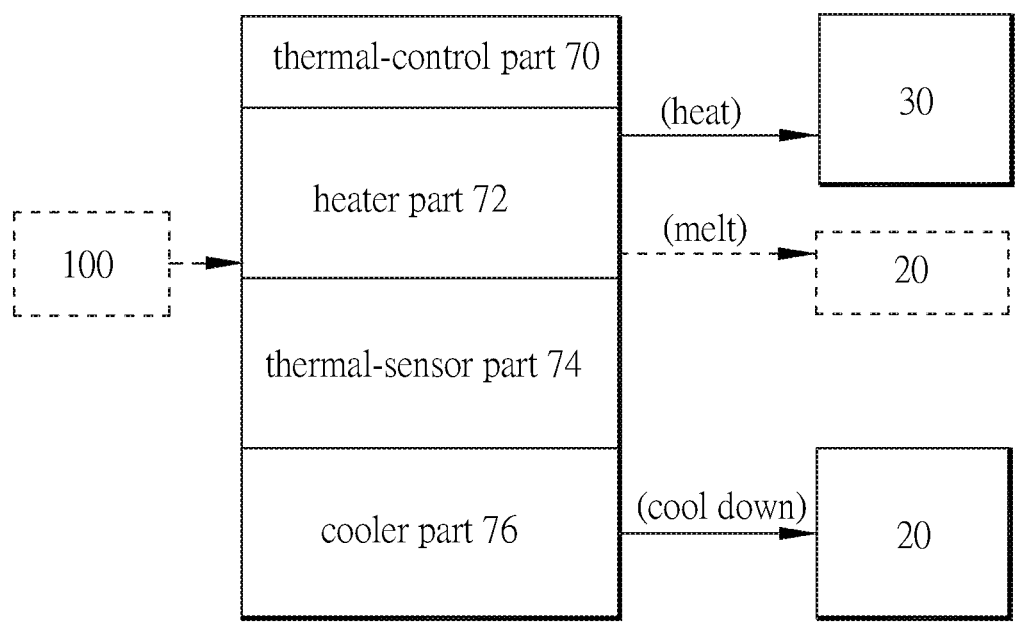
FIG. 2(B) is a schematic diagram illustrating the detailed structure of the thermal-control part according to an embodiment of the present invention.

Next, the details of the thermal-control part 70 will be described. FIG. 2 (B) is a schematic diagram illustrating the detailed structure of the thermal-control part 70 according to an embodiment of the present invention. Please refer to FIG. 1 and FIG. 2(B) at the same time. In this embodiment, the thermal-control part 70 includes a heater part 72, a thermal-sensor part 74, and a cooler part 76. The heater part 72, the thermal-sensor part 74 and the cooler part 76 can accept instructions through the connection to the microcontroller 60 or another chip, wherein the heater part 72 can cooperate with the material auto-destruction module 100.

The heater part 72 heats the nozzle 30 or the periphery of the nozzle part 30 according to an instruction from the microcontroller 60, so that the material 22 can be heated to the specific temperature as the material 22 ejecting from the nozzle part 30. In one embodiment, the heater part 72 is implemented by a heater, a heating tube, a temperature-rising electronic device, a PTC thermistor heating device, a temperature-rising and heat-resisting ceramic device, a temperature-rising and heat-resisting non-metal device, a far-infrared heating device, or a semiconductor device. The above description is only an example and not a limitation of the present invention.

The thermal-sensor part 74 maintains the temperature of the nozzle part 30 or around the nozzle part 30 according to an instruction from the microcontroller 60, so that the nozzle part 30 can maintain the temperature required for the printing task. In one embodiment, the thermal-sensor part 74 is implemented by a thermal-sensor to detect the temperature of the material delivery channel 20 and/or the nozzle part 30, and it is not limited thereto. In one embodiment, the heater part 72, the thermal-sensor part 74 and the microcontroller 60 can be integrated. The thermal-sensor part 74 detects the low temperature and activates to the microcontroller 60 to drive the heater part 72 to maintain the temperature required for printing task. In another embodiment, the thermal-sensor part 74 may also include a chip to control the heater part 72 directly. The aforementioned description is only an example and not a limitation of the present invention.

The cooler part 76 cools down the material delivery channel 20 or the periphery thereof according to an instruction from the microcontroller 60 in order to prevent the material 22 preheated in the material delivery channel 20. In one embodiment, the cooler part 76 is implemented by a cooler, a temperature-reduction electronic device, a temperature-reduction gas supply device (eg, compressed gas or low temperature gas), a heat-source dispersion device (eg, a fan), etc., and it is not limited thereto. In one embodiment, the cooler part 76, the thermal-sensor part 74 and the microcontroller 60 can be integrated. The thermal-sensor part 74 detects the high temperature and activates the microcontroller 60 to drive the cooler part 76 to maintain the temperature required for the printing task. In another embodiment, the thermal-sensor part 74 includes a chip to control the cooler part 76 directly. The aforementioned description is only an example and not a limitation of the present invention.

In addition, in one embodiment, the heater part 72 cooperates with the material auto-destruction module 100. When the printing task is completed, the material auto-destruction module 100 drives the heater part 72 to melt the material delivery channel 20 thereby preventing the exposure of the material 22. In one embodiment, the heater part 72 melts the material delivery channel 20 but does not damage other components (eg, the nozzle part 30), In one embodiment, when executing the material auto-destruction program, the material auto-destruction module 100 drives the heater part 72 to heat the material delivery channel 20 or the periphery thereof (for example, the heater part 72 moves to the periphery of the material delivery channel 20). Moreover, in another embodiment, the heater part 72 may heat the nozzle part 30 or the periphery of the nozzle part 30 to melt the material delivery channel 20 through heat conduction by deactivating the cooler part 76. In addition, the heater part 72 can be controlled by the material auto-destruction module 100 or the microcontroller 60, while the present invention is not limited thereto. In addition, the material auto-destruction module 100 can be integrated with the parameter part 40 to be the printing parameters, or the material auto-destruction module 100 can be integrated with the thermal-control part 70. The aforementioned description is only an example and not a limitation of the present invention.

In addition, in one embodiment, after the printing task is completed, the parameter auto-destruction module 110 executes a parameter auto-destruction program to destroy the data in the parameter part 40 to prevent the exposure of printing parameters. The parameter auto-destruction module 110 destroys the parameters by itself or through the microcontroller 60, while the present invention is not limited thereto. In addition, the parameter auto-destruction module 110 can be integrated with the parameter part 40, the microcontroller 60 or the material auto-destruction module 100. The aforementioned description is only an example and not a limitation of the present invention.

Figure 2C:
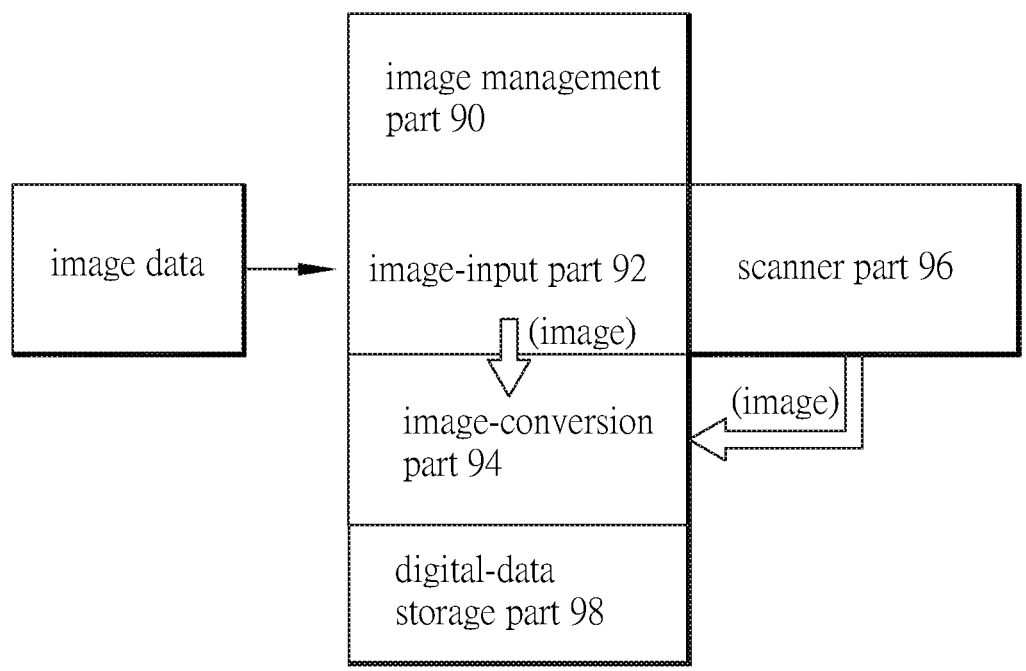
FIG. 2(C) is a schematic diagram illustrating the detailed structure of the image management part according to an embodiment of the present invention.

Next, the details of the image management part 90 will be described. FIG. 2(C) is a schematic diagram illustrating the detailed structure of the image management part 90 according to an embodiment of the present invention. Please refer to FIG. 1 and FIG. 2(C) at the same time. In this embodiment, the image management part 90 includes an image-input part 92 and an image-conversion part 94.

The image-input part 92 obtains data from an external device, such as receives a file through a USB device, receives three-dimensional image (eg, .skp file, .dae file, .3ds file, .OBJ file, .PLY file, .WRL file, .STL file, .AOP file, ASCII file, .PTX file, .E57 file, .XYZRGB file, etc.) established by another device, receives image data from the camera, and it is not limited thereto. In one embodiment, the image-input part 92 includes a solid connection port, such as a USB interface, various transmission connectors, etc., and it is not limited thereto. In addition, the image-input part 92 may include a chip to receive image from an external device through a wireless transmission manner. In one embodiment, the image-input part 92 is controlled by a chip or implemented by a circuit. The aforementioned description is only an example and not a limitation of the present invention.

The image-conversion part 94 includes a computer program product to convert the image obtained by the image-input part 92 into a digital printing roadmap recognizable for the microcontroller 60, to allow the microcontroller 60 to control the extruder device 10 to perform an actual printing task based on the digital printing roadmap. In one embodiment, the image-conversion part 94 includes a chip incorporating the computer program product to perform the image conversion. Moreover, in another embodiment, the microcontroller 60 may incorporate the computer program product to perform image conversion. In one embodiment, the image-conversion part 94 can be implemented by a circuit. In one embodiment, the digital printing roadmap is a specific image file recognizable for the machine to obtain the three-dimensional shape of the target product, such as a three-dimensional computer model, .STL file, .OBJ file, .SCAD file, .3DS file, .AMF file, etc. The description related to the .AMF file format can be seen in page 11 of Technical Considerations for Additive Manufactured Medical Devices, Guidance for Industry and Food and Drug Administration Staff, issued on Dec. 5, 2017, which states "When possible, final device files for printing should be maintained and archived or referenced in robust, standardized formats that are able to store additive manufacturing (AM)-specific information so that the information can be retrieved when needed. For instance, one option is the Additive Manufacturing File format (AMF) described in the ISO/ASTM 52915 Standard specification for additive manufacturing file format (AMF)." For the AMF specification, ISO/ASTM 52915 describes a framework for an interchange format to address the current and future needs of additive manufacturing technology. As additive manufacturing technology is quickly evolving from producing primarily single-material, homogenous shapes to producing multi-material geometries in full color with functionally graded materials and microstructures, there is a growing need for a standard interchange file format that can support these features. The AMF may be prepared, displayed and transmitted provided the requirements of the specification are met. When prepared in a structured electronic format, strict adherence to an extensible markup language (XML) schema is required to support standards-compliant interoperability. A WorldWideWeb Consortium (W3C) XML schema definition (XSD) for the AMF is available. The aforementioned description is only an example and not a limitation of the present invention.

In one embodiment, the image management part 90 further includes a scanner part 96 to obtain the three-dimensional image modeling of the target (eg, .skp file, .dae file, .3ds file, .OBJ file, .PLY file, .WRL file, .STL file, .AOP file, .ASCII file, .PTX file, .E57file, .XYZRGB file, and so on) through the direct scanning. For example, when the present invention is applied to medical application, the scanner part 96 scans the defect portion of a patient to obtain a three-dimensional image modeling, and the three-dimensional image modeling may be converted into a digital layout via the image-conversion part 94 (or other algorithm). In one embodiment, the scanner part 96 includes or is connected to a scanner. In one embodiment, the scanner part 96 performs scanning by using infrared scanning, white structural light scanning, blue light scanning, laser scanning, or ultrasonic scanning, and it is not limited thereto. In one embodiment, the scanner part 96 includes a digital-data storage part 98 for storing the three-dimensional image modeling, wherein the digital-data storage part 98 is implemented by a read-only memory or a flash memory, and it is not limited thereto. In one embodiment, the scanner part 96 may be connected or integrated with the digital printing surface-positioning module part 44 to determine the position of the target. In one embodiment, the scanner part 96 transmits data to other components with a wired or wireless transmission manner. In one embodiment, the scanner part 96 is manually removable. In one embodiment, the scanner part 96 is integrated with the image-input part 92. The aforementioned description is only an example and not a limitation of the present invention.

Next, the description gets to the operation process of the extruder device 10 according to an embodiment of the present invention, that is, the operation process performed after the extruder device 10 is assembled with the 3D printer, and various detailed flowcharts of the operation process may refer to FIGS. 3 to 6. It should be noted that, in other embodiments, the extruder device 10 may be mounted on another apparatus, such as a robot arm, etc., while the present invention is not limited thereto.

Figure 3:
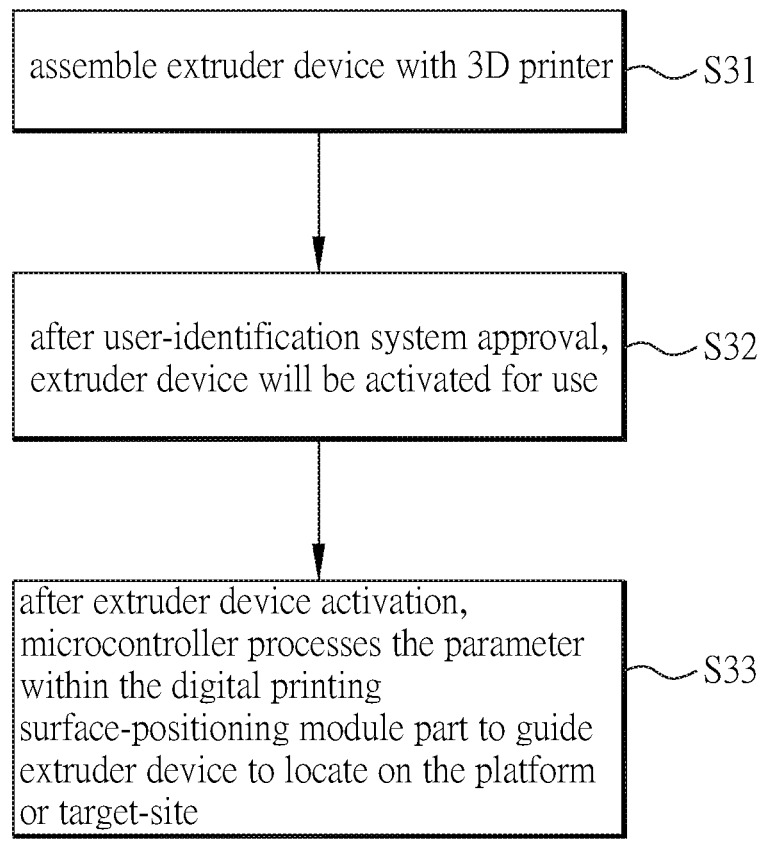
FIG. 3 is a preceding operation flowchart for the extruder device according to an embodiment of the present invention.

FIG. 3 is the activation flowchart for the extruder device 10 according to an embodiment of the present invention, which illustrates the flowchart for combining the extruder device 10 with the 3D printer, and please refer to FIGS. 1 and 2 and FIG. 3 at the same time.

First, step S31 is executed, in which the extruder device 10 assembles with the 3D printer. In one embodiment, the extruder device 10 includes a connection portion corresponding to the 3D printer for facilitating assembly. In one embodiment, the user can self-assemble the extruder device 10 with a 3D printer, i.e., the extruder device 10 is a kind of consumable item for the user.

Then, step S32 is performed, in which the extruder device 10 or the 3D printer identifies the user for the activation of the extruder device 10 (for example, releasing the function lock). In one embodiment, the extruder device 10 or the 3D printer pre-stores the data for recognition of the user, such as a predetermined password, fingerprint identification data, etc., and it is not limited thereto. As a result, the risk of printing parameters exposure decreases. Even the extruder device 10 was stolen, it can't be activated. In one embodiment, the extruder device 10 is pre-locked, and can be unlocked for using only after the user-identification approval.

Then, step S33 is performed. After the extruder device 10 activation, the microcontroller 60 processes the parameter processes the parameter within the digital printing surface-positioning module part 44 to guide the extruder device 10 to locate the printing surface on the platform or target-site. That is, the microcontroller 60 shifts the extruder device 10 to the printing position based on the parameters provided by the digital printing surface-positioning module part 44. For example, if the microcontroller 60 is incorporated inside the extruder device 10, the microcontroller 60 transmits instructions to the 3D printer to allow the 3D printer to shift the extruder device 10. If the microcontroller 60 is incorporated inside the 3D printer, 3D printer directly shifts the extruder device 10. After the extruder device 10 is shifted to the printing position, the extruder device 10 immediately starts the printing task.

Figure 4:
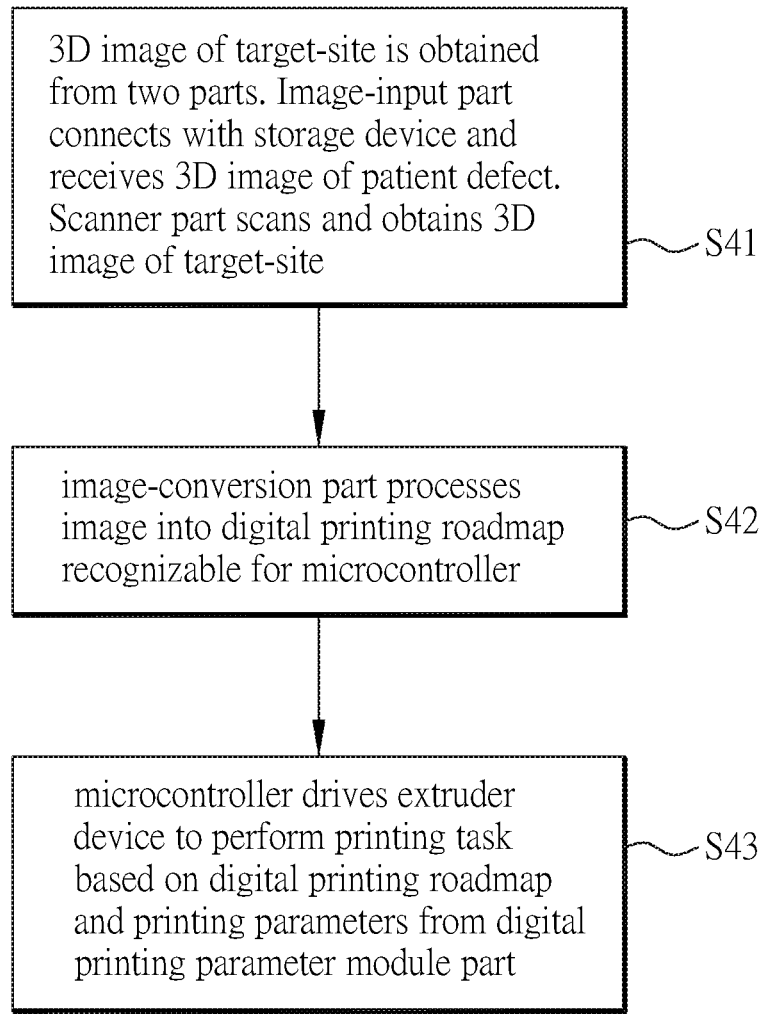
FIG. 4 is an image-input operation flowchart for the extruder device according to an embodiment of the present invention.

FIG. 4 is an image input flowchart for the extruder device 10 according to an embodiment of the present invention. Please refer to FIGS. 1 to 3 and FIG. 4 at the same time.

First, step S41 is executed, in which the image-input part 92 of the extruder device 10 obtains image data (three-dimensional image of target-site) for the printing task, such as three-dimensional image modeling. In one embodiment, the three-dimensional image modeling was transmitted into the image-input part 92 through a storage device, such as a USB device and the like. In another embodiment, the user may transmit the three-dimensional image modeling through a wireless transmission manner. In addition, if the extruder device 10 includes or connects to the scanner part 96, the user may use the scanner part 96 to obtain the three-dimensional image modeling for the printing task. Besides, in some embodiments, the printing parameters for the printing task may be transmitted into the parameter part 40 through a manner similar to step S4, and it is not limited thereto.

Then, step S42 is executed, in which the image-conversion part 94 processes the image for the printing task into a digital printing roadmap recognizable for the microcontroller 60, and stores the digital printing roadmap in, for example, the extruder device 10 or 3D printer. In one embodiment, the image conversion is implemented by a specific algorithm. Since the image conversion is not the focus of the present invention, a detailed description therefor is deemed unnecessary.

Then, step S43 is executed, in which the microcontroller 60 drives the extruder device 10 to perform the printing task based on the digital printing roadmap and the printing parameters from the digital printing parameter module part 42. In one embodiment, the microcontroller 60 controls the extruder device 10 to print out the target product according to the digital printing roadmap, and controls other components, such as the extrusion part 50 and the thermal-control part 70, according to the printing parameters of the parameter part 40.

It should be noted that the flow of FIG. 3 and the flow of FIG. 4 are not limited to a specific timing sequence, as long as they are reasonably achieved.

Figure 5:
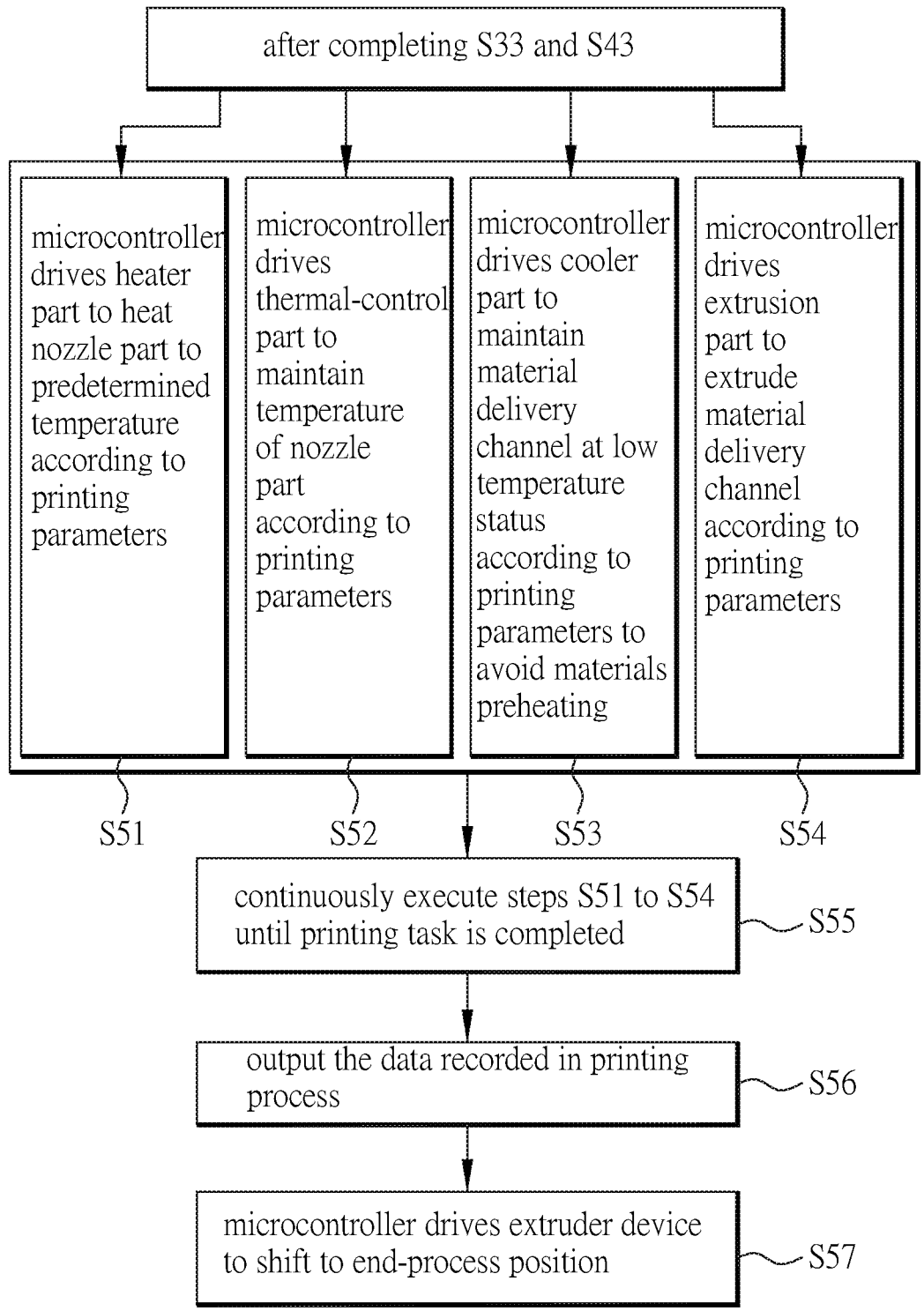
FIG. 5 is an actual printing operation flowchart for the extruder device according to an embodiment of the present invention.

FIG. 5 is an actual printing flowchart for the extruder device 10 according to an embodiment of the present invention. Please refer to FIGS. 1 to 4 and FIG. 5 at the same time. This flow follows the flow of FIG. 3 and FIG. 4; that is, the extruder device 10 has been shifted to the printing position and is ready to start printing.

First, step S51 is executed, in which the microcontroller 60 drives the heater part 72 to heat the nozzle part 30 to the predetermined temperature according to the printing parameters. In one embodiment, a heat insulation material is disposed between the nozzle part 30 and the material delivery channel 20 to prevent the heat-conduction from the nozzle part 30 to the material delivery channel 20.

At the same time, step S52 is executed, in which the microcontroller 60 drives the thermal-control part 70 to maintain the temperature of the nozzle part 30 according to the printing parameters. In one embodiment, the thermal-control part 70 maintains the nozzle part 30 at the temperature required for the material 22 for the printing task.

Meanwhile, step S53 is executed, in which the microcontroller 60 drives the cooler part 76 to maintain the material delivery channel 20 at a low temperature status according to the printing parameters to avoid materials preheating. This step may be matched with the thermal-control part 70 to detect the temperature around the material delivery channel 20 to timely perform feedback adjustment.

Simultaneously, step S54 is executed, in which the microcontroller 60 drives the extrusion part 50 to extrude the material delivery channel 20 according to the printing parameters, so as to eject the material 22 out of the nozzle part 30. In this step, the microcontroller 60 may control the extruder device 10 to print an article based on the digital printing roadmap.

Afterwards, step S55 is executed, in which the steps S51 to S54 are continuously executed until the printing task is completed; that is, the target product is printed out.

Then, step S56 is performed, in which, after the printing task is completed, all data related to the printing task are exported by an output part. In one embodiment, the data related to the printing task includes, and is not limited to, digital printing roadmap, printing time, user identification, and operating process record. In one embodiment, the output part may be implemented through various ways, such as a USB interface, wireless transmission, and the like, and it is not limited thereto. In some embodiments, the data related to the printing process may not be outputted; that is, step S56 may not be executed.

Furthermore, step S57 is executed, in which, when the printing task is completed, the microcontroller 60 drives the extruder device 10 to shift to an end-process position. In one embodiment, the end-process position is determined in advance; moreover, in other embodiments, the extruder device 10 may be shifted to the end-process position by the user.

It should be noted that the aforementioned steps are for illustrative purpose only and, in actual application, the timing sequence of the steps S51 to S54 and the timing sequence of the steps S56 to S57 are not limited. As long as it is reasonable and feasible, they all fall within the scope of the present invention. In addition, the steps of this flow can also be modified by adding new steps or removing existent steps without being limited to the aforementioned examples.

Figure 6:
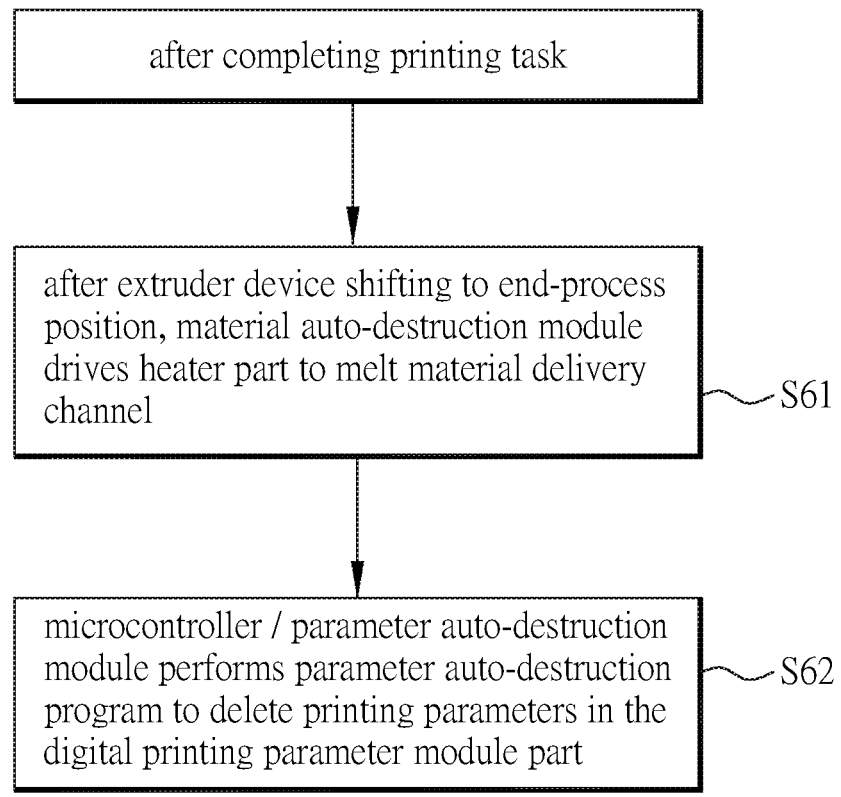
FIG. 6 is an auto-destruction operation flowchart for the extruder device according to an embodiment of the present invention.

FIG. 6 is an auto-destruction flowchart for the extruder device 10 according to an embodiment of the present invention. Please refer to FIGS. 1 to 5 and FIG. 6 at the same time. This flow follows the flow of FIG. 5, that is, the case where the printing task has been completed and the extruder device 10 has been shifted to the end-process position.

First, step S61 is executed, in which, after the extruder device 10 is shifted to the end-process position, the material auto-destruction module 100 drives the heater part 72 to melt the material delivery channel 20. In one embodiment, step S61 is executed in a safe manner. For example, when the material delivery channel 20 is melted, the cooler part 76 is activated to prevent the heat transmitted from the nozzle part 30, and the heat insulation medium 32 also blocks the heat transmitted to other components, to avoid of components destruction. In one embodiment, the heater part 72 is heated to a specific temperature, for example, between 200 and 1000 Celsius degree. In one embodiment, this specific temperature is different from the heating temperature of step S51. For example, at this specific temperature, the material delivery channel 20 may melts but the nozzle part 30 is not damaged, while at the heating temperature of step S51 does not melt any components. In one embodiment, in addition to the material delivery channel 20, other related components may be melted, such as the image management part 90, the parameter part 40, and the like, but the present invention is not limited thereto.

Then, step S62 is executed, in which the parameter auto-destruction module 110 itself performs the parameter auto-destruction program or the microcontroller 60 controls the parameter auto-destruction module 110 to delete the parameter, moreover, to destroy the components that contain the printing parameters through heating, voltage or current to delete the printing parameters and all data storing in the parameter part 40. In one embodiment, the digital printing roadmap is also deleted. In one embodiment, the user identification information is also deleted, and it is not limited thereto. In addition, in some embodiments, only step S61 or step S62 is executed. In addition, in some embodiments, the priority of executing step S61 and step S62 may be changed.

After the material delivery channel 20 is melted and/or the printing parameters of the parameter part 40 are deleted, the user may directly discard the extruder device 10 or recycle some of the components (eg, the nozzle part 30) for reuse. As a result, the data related to the printing task (such as the material 22, printing parameters, etc.) will be directly destroyed after the printing task is completed to prevent the risk of confidential data exposure.

Accordingly, the extruder device 10 provided by the present invention includes the biocompatible material and can be applied to print product within the medical space such as surgery operation room for orthopedics, medical cosmetology, otolaryngology, and neurosurgery. In addition, the extruder device 10 can be replaced by the user to increase the convenience for carrying. Moreover, the auto-destruction mechanism after the completion of printing tasks can decrease the risk of materials or printing parameters exposure to improve the security greatly.

Although the present invention has been explained in relation to its preferred embodiment, it is to be understood that many other possible modifications and variations can be made without departing from the spirit and scope of the invention as hereinafter claimed.

What is claimed is:

1. An extruder device comprising:
    a material delivery channel for assembly with a n extrusion part, wherein the extrusion part is an extrusion apparatus comprising a roller set and a rotation motor;
    a nozzle part connecting to the material delivery channel for ejecting out a material in the material delivery channel;
    a parameter part for providing printing parameters for a printing task to a microcontroller, wherein the parameter part is a parameter provider comprising a chip, a circuit or a computer program product;
    a thermal-control part for controlling a temperature of the nozzle part and the material delivery channel according to the printing parameters for the printing task, wherein the thermal-control part is a thermal-controller comprising a heating component, a thermal sensor and a cooling component;
    a parameter auto-destruction module for destroying the printing parameters after the printing task is completed, wherein the parameter auto-destruction module comprises a chip or a computer program product; and
    a material auto-destruction module for melting the material delivery channel after the printing task is completed, wherein the material auto-destruction module comprises a chip or a computer program product;
    wherein the microcontroller controls the extrusion part according to the printing parameters of the printing task, so that the extrusion part delivers the material inside the material delivery channel to the nozzle part.

2. The extruder device as claimed in claim 1, wherein the material auto-destruction module destroys the material delivery channel through the thermal-control part to melt the material delivery channel.

3. The extruder device as claimed in claim 1, wherein the cooling component is for cooling down the material delivery channel.

4. The extruder device as claimed in claim 1, further comprises an image-conversion part for converting an image data into a digital printing roadmap recognizable for the microcontroller.

5. The extruder device as claimed in claim 1, further comprising a scanner part for scanning a target to obtain a three-dimensional image modeling corresponding to the target.

6. The extruder device as claimed in claim 1, wherein the material delivery channel is made of biocompatible material.

7. The extruder device as claimed in claim 1, wherein the nozzle part is made of biocompatible material.

8. The extruder device as claimed in claim 1, wherein the material is biodegradable.

9. The extruder device as claimed in claim 1, further comprising a wired or wireless module for communication between the extruder device and other information center.

10. An extruder device comprising:
    a material delivery channel for assembly with an extrusion part, wherein the extrusion part is an extrusion apparatus comprising a roller set and a rotation motor;
    a nozzle part connecting to the material delivery channel for ejecting out a material in the material delivery channel;
    a parameter part for providing printing parameters for a printing task to a microcontroller, wherein the parameter part is a parameter provider comprising a chip, a circuit or a computer program product;
    a thermal-control part for controlling a temperature of the nozzle part and the material delivery channel according to the printing parameters for the printing task, wherein the thermal-control part is a thermal-controller comprising a heating component, a thermal sensor and a cooling component; and
    a material auto-destruction module for melting the material delivery channel after the printing task is completed, wherein the material auto-destruction module comprises a chip or a computer program product,
    wherein the microcontroller controls the extrusion part according to the printing parameters of the printing task, so that the extrusion part delivers the material inside the material delivery channel to the nozzle part.

11. The extruder device as claimed in claim 10, wherein the material auto-destruction module destroys the material delivery channel through the thermal-control part to melt the material delivery channel.

12. The extruder device as claimed in claim 10, wherein the cooling component is for cooling down the material delivery channel.

13. The extruder device as claimed in claim 10, further comprising an image-conversion part for converting an image data into a digital printing roadmap recognizable for the microcontroller.

14. The extruder device as claimed in claim 10, further comprising a scanner part for scanning a target to obtain a three-dimensional image modeling corresponding to the target.

15. The extruder device as claimed in claim 10, wherein the material delivery channel is made of biocompatible material.

16. The extruder device as claimed in claim 10, wherein the nozzle part is made of biocompatible material.

17. The extruder device as claimed in claim 10, wherein the material is biodegradable.

18. The extruder device as claimed in claim 10, further comprising a wired or wireless module for communication between the extruder device and other information center.

* * * * *